(No Model.)
W. R. CLARK.
ANTIFRICTION ADJUSTABLE TAP.
No. 535,274. Patented Mar. 5, 1895.
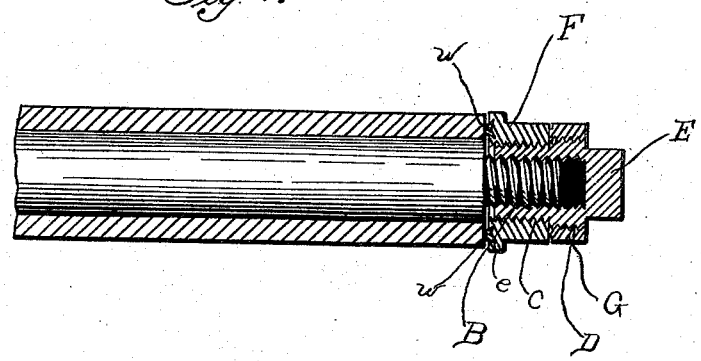
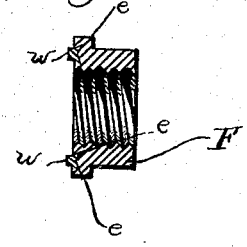
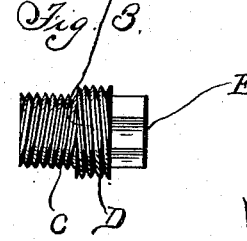
WITNESSES
H. J. Louth.
G. M. Copenhaver.
INVENTOR
Wm. R. Clark.
By Chas. E. Barber
Attorney

UNITED STATES PATENT OFFICE.

WILLIAM R. CLARK, OF PLATTSBURG, NEW YORK.

ANTIFRICTION ADJUSTABLE TAP.

SPECIFICATION forming part of Letters Patent No. 535,274, dated March 5, 1895.

Application filed April 7, 1894. Serial No. 506,707. (No model.)

*To all whom it may concern:*

Be it known that I, WILLIAM R. CLARK, a citizen of the United States, residing at Plattsburg, in the county of Clinton and State of New York, have invented certain new and useful Improvements in Antifriction Adjustable Taps, of which the following is so full, clear, and exact a description as will enable those skilled in the art to which it appertains to make and use the same, reference being had to the accompanying drawings, in which—

Figure 1 is a transverse section of my improved device, showing it attached to the axle. Fig. 2 is a cross section of the washer nut. Fig. 3 is an elevation of the tap.

The object of my invention is to provide a tap for buggy axles or for pulley shafts, by the use of which due compensation for wear may be made and a perfect adjustment secured, and to that end my invention consists of providing an anti-rattler, as will be hereinafter described and particularly pointed out in the claim at the end of the specification.

In the accompanying drawings, A designates a tap which is screw-threaded internally at B and which is provided with a right-handed screw-thread C and a left-handed screw thread D, and a nut E at the outer end. At the inner end of the tap on the outside, I provide a correspondingly screw-threaded washer-nut F, and between that and the outer end of the tap, I provide a jam nut G. The washer nut is provided with a groove which may be larger at the bottom than at the top as shown in cross section in Fig. 2, and a washer W, of Babbitt or soft metal may be forced into the groove, and its edges *e, e*, forced apart by the oblique faces of the angular ridge *f*, and the washer is thus locked in position. This washer projects beyond the inner surface of the washer nut and is adapted to abut against the box of the wheel or pulley and which serves the double purpose of deadening the sound and of providing a washer against which the end of the box rubs as the wheel or pulley is rotated.

The operation of my device is as follows: The washer nut is adjusted to any desired position on the tap and the jam-nut is screwed firmly up against it to hold it in position. The tap is then screwed on to the shaft or axle and the device is in operative position.

Having thus described my invention, what I desire to secure by Letters Patent, and what I therefore claim, is—

An anti-rattler tap of the character described, consisting of a hollow piece of metal interiorly screw-threaded and provided with right and left handed screw-threads on the outside and a washer nut provided with a groove wider at the bottom than at the top or mouth and a washer of soft metal extending beyond the face of the nut, said washer also grooved as described and adapted to be forced into said groove in the washer nut and expanded to hold it in said groove, a ridge in the base of said groove the inclined faces of which cause the bifurcated edges of the soft metal washer to separate or move away from each other, substantially as described.

In testimony whereof I affix my signature in the presence of two witnesses.

WILLIAM R. CLARK.

Witnesses:
 HORATIO O. WHYMAN,
 WILLIAM L. PATTISSON.